Patented Oct. 30, 1923.

1,472,115

UNITED STATES PATENT OFFICE.

LOUIS F. CLARK, OF POTRERILLOS, CHILE.

PROCESS OF TREATING SOLUTIONS OF METALS.

No Drawing. Application filed October 28, 1921. Serial No. 511,176.

*To all whom it may concern:*

Be it known that I, LOUIS F. CLARK, a citizen of the United States, and resident of Potrerillos, Chile, have invented certain new and useful Improvements in the Process of Treating Solutions of Metals, of which the following is a specification.

In a previous application No. 482,018, filed July 2, 1921, I have described the treatment of solutions of certain metals, particularly copper, whereby metallic and other impurities are precipitated, generally as basic salts, by heat and pressure and the treatment of the remaining solution by a reagent to precipitate in metallic form the copper or other metal desired; and I have described the use of formic acid ($H_2CO_2$) as a precipitant of copper from its solutions, either after the preliminary precipitation under heat and pressure or without such preliminary precipitation. The present is a division of the foregoing application and is directed particularly to my discovery that formic acid and equivalent organic compounds can be used in this way. The decomposition and oxidation of the formic acid at increased temperature and pressure serves to reduce the copper solution so that the copper is precipitated as the metal. The formic acid may be used in the heat regenerative system described and claimed in the foregoing application as well as in various other methods of precipitating copper.

The formic acid has advantages over sulphur dioxide because of its physical condition at normal temperature and pressure. It is advantageous in the case of sulphuric acid solutions because in the precipitation it does not regenerate so much free sulphuric acid as sulphur dioxide regenerates. In other cases it is advantageous because, although it requires about the same temperature for its action as sulphur dioxide, yet only about one-half the pressure is required in the precipitator. Another advantage is that at the temperature of its action it is entirely decomposed into inert products and there is no necessity to recover excesses (as in the case of sulphur dioxide) except in so far as it may be desirable to recover carbon dioxide from which to reproduce fresh formic acid. In cost it is a close competitor with sulphur dioxide.

The formic acid may be used as a precipitant for copper, either alone or in conjunction with sulphur dioxide or other reagents. Examples of my process are the following.

First, a solution of copper oxide in any solvent containing sulphuric acid, and containing metallic impurities, chiefly iron, arsenic and alumina and containing also alkalies and phosphorus, is heated and run into a precipitation tank where the pressure is brought to about 100 pounds and the temperature to 170 degrees centigrade as described in detail in my above mentioned application. This pressure and temperature cause a precipitation of the impurities.

The precipitate having been removed, the pressure and temperature are reduced and formic acid injected by means of a pressure higher than that in the liquid. The temperature is brought up to the best point for the action of the reagent, 155 or 165 degrees centigrade, and metallic copper will be precipitated. The decomposition product, carbon dioxide, may be recovered for use in making more formic acid.

Or after removing the salts precipitated at the pressure of 100 pounds and the temperature of 170 degrees centigrade, the liquor may be transferred to another tank and formic acid introduced under conditions of pressure more nearly corresponding to the temperature, or about 75 pounds and 160 degrees centigrade.

Second, the solution, with its impurities, is passed into a tank and brought to 75 pounds pressure and 160 degrees centigrade temperature and the formic acid injected into it. It will then reduce and precipitate the metallic copper out of the solution.

The solution will then be treated in the same tank or in a separate tank to the pressure and temperature necessary to eliminate the impurities, so as to secure a pure liquor which may be re-used for forming copper solution. Also the metals, alkalies and phosphates which I have referred to as impurities, may be recovered as more or less valuable by-products; this being true also in the first example of my process. The invention is applicable to processes in which various products are precipitated and removed from the solution and is applicable to the recovery of copper and other metals of the same class and compounds thereof. The invention is applicable also to other solutions, and particularly to sulphate solutions containing other dissolved acid ions besides the sulphate ion. In the leaching of the ore with sulphuric acid solutions, we find present also small amounts of nitric acid and hydrochloric acid which may come from impure sulphuric acid or may be leached from the ore itself which contains traces of nitrates and chlorides. These are the other dissolved acid ions referred to above. They do not meterially interfere with the present process. Generally the cheapest and most effective solvent for oxidized copper minerals is one containing sulphuric acid. But such a solution is also a solvent for impurities, particularly iron, alumina and arsenic. My present invention may be applied not only to such solutions but to other solutions which do not carry the same quantity of impurities.

Third, the solution with its impurities is treated with formic acid to reduce and precipitate the metallic copper as above described. After removal of the copper the remaining impure liquor may be re-used in any one of various ways, as for example, by circulating it through a system in which it is bled or partly withdrawn and replenished by fresh pure solvent.

Among the organic compounds which are equivalents for formic acid in connection with this invention I have mentioned a compound of formic acid and sulphur dioxide. By "equivalent organic compounds" are meant those which react in somewhat the same way as formic acid. They might be classified as "aliphatic compounds" which contain the aldehyde group. On oxidation, they yield the corresponding carboxylic acids.

(a) Formaldehyde oxidizes to formic acid.
(b) Acetaldehyde oxidizes to acetic acid.
(c) Acrolein oxidizes to acrylic acid.
(d) Gloxal oxidizes to glycolic acid.
(e) Glucoses oxidize to saccharic and mucic acids.

Formic acid, itself, is peculiar in that it manifests not only the character of an acid, but also that of an aldehyde. It retains the aldehyde group (CHO) and is thus a reducing agent, the same as formaldehyde. Further, formic acid and formaldehyde are particularly suitable for the purpose of precipitation of metallic copper from a leaching solution at high temperature, because their complete oxidation is effected at a reasonable temperature (about 160 degrees centigrade), yielding at the same time, a gas, carbon dioxide, which may be boiled out of the solution and leave no contamination. The more complex aldehydes, e. g., acetaldehyde, on oxidation under the same conditions, give acids which resist further oxidation, leading to decomposition, until much higher temperatures are reached, and hence, these acids would largely remain in the solution, undecomposed, and constitute a serious accumulation of organic matter.

Thus, formic acid and formaldehyde are presumably the most suitable compounds for the work intended and of these two, formic acid has many advantages, e. g. it is very much the cheaper and it is a liquid at ordinary temperature and pressure, thus facilitating its use. A general characteristic of all the compounds referred to is that they will reduce an ammonical-silver solution with formation of a metallic mirror.

It is a general characteristic of aliphatic aldehydes (a few exceptions) that they will combine with alkaline bi-sulphites and crystallize out of saturated aqueous solutions as solid salts. Conversely, these same compounds may be formed by passing $SO_2$ into an aqueous alkaline (e. g. NaOH) solution of an aldehyde (e. g. formaldehyde). The formula of such a compound might be written:

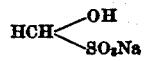

"sodium formaldehyde bisulphite."

Thus, a very active and comparatively stable solid salt is formed which, when dissolved in an acid solution and the tamparature raised, yields both formaldehyde and sulphur dioxide. If the temperature is further increased to about 160 degrees C. both of these constituents precipitate metallic copper. This is the type of compound referred to as a combination of organic compound and sulphurous acid.

Compounds containing the aldehyde group frequently polymerize, i. e. the single molecules combine with each other and give products of somewhat different physical properties. Thus, formaldehyde, $CH_2O$, a gas, condenses to paraformaldehyde $(CH_2O)_n$ which is a solid at ordinary temperature. When these polymeric modifications are heated in acid solution according to the procedure described for this process of copper precipitation, they revert to their original condition and produce the same effects.

It is my object to precipitate metallic copper from solutions by treatment of the solution in an auto-clave with aliphatic compounds containing the aldehyde group (CHO). It is, however, possible to add other substances to the auto-clave which are aliphatic organic compounds which will precipitate metallic copper at high temperature and yet which do not, before being placed in the auto-clave, contain an aldehyde group. Yet they precipitate the copper because of the presence of this aldehyde group—a molecular arrangement which they attain because of the catalytic action of the acid and dissolved salts in the solution. Thus, the precipitation of the copper becomes a secondary reaction contingent upon the primary formation of the aldehyde. The following are examples:

(a) Acetylene ($C_2H_2$), a gas, may be injected into the solution at high temperature. Because of the presence of dissolved salts and acid it may become hydrated to yield acetaldehyde—a precipitant for copper under these conditions.

(b) Cellulose (cotton, etc.,) solids, may be added to the solution in the auto-clave and the temperature then raised. By a process of hydrolysis the complete molecules of the organic substance are broken down into simpler compounds like glucose, which contain the aldehyde group and thus become precipitants of copper.

(c) Animal fats—essentially glycerolesters of fatty acids, by the same treatment, yield in the auto-clave, acrolein and glycerylaldehyde, precipitants of copper because they have undergone a molecular rearrangement and developed the aldehyde group.

In these cases, though it is not the aldehyde compound which is previously formed and then introduced into the solution, such compounds are generated or developed in the solution itself from original substances which are introduced, and it will be understood that by catalytic and various other physical and chemical operations the aldehyde compounds may be generated from other substances introduced into the solution.

Besides the aliphatic aldehydes referred to as equivalents of formic acid, there are also a large number of carbocyclic aldehydes. These are generally too expensive for consideration in comparison with formic acid, as the other aliphatic aldehydes are generally inefficient compared with formic acid, so that the latter is preferred above all compounds known to me for the purpose. Another convenient reagent may be produced as follows. It is known that sulphates and sulphurous acid form insoluble compounds with aqueous solutions or organic compounds containing the aldehyde group (as is true of the compound referred to above). When such organic compounds are used in conjunction with sulphurous acid we may first form an insoluble precipitate with the sulphurous acid and the organic compound containing the aldehyde group so as to collect the sulphurous acid anhydride; and we may subsequently use this precipitate, formed under normal conditions, by adding it to solutions for the precipitation of metallic copper under other conditions. Thus a solid substance, made by combining an organic compound and sulphurous acid, both of which are active precipitants of metallic copper, will be added to a copper solution; and both constituents of the added compound become active at high temperature and at high pressure.

Though I have described with particularity of detail certain processes embodying my invention, yet it is not to be understood therefrom that the invention is restricted to the particular embodiments disclosed. Various modifications thereof may be made in the steps and in the order thereof, and the invention may be utilized alone or in other connections by those skilled in the art without departure from the invention as defined in the following claims.

What I claim is:

1. The method of treating a copper solution which consists in subjecting it to a high temperature and pressure and to a reducing agent including formic acid to precipitate metallic copper.

2. The method of treating a copper solution which consists in subjecting it to a high temperature and pressure and to a reducing agent consisting of formic acid and sulphur dioxide to precipitate metallic copper.

3. The method of treating a copper solution which consists in subjecting it to a high temperature and pressure and to a reducing agent including formic acid to precipitate metallic copper, forming carbon dioxide by the decomposition of the formic acid, and recovering such carbon dioxide by boiling it off from the solution.

4. The method of treating a sulphate copper solution which consists in subjecting it to a high temperature and pressure and to a reducing agent including formic acid to precipitate metallic copper.

5. The method of treating a copper solution containing impurities which consists in first subjecting it to a high temperature and pressure and precipitating the copper by means of a re-agent including formic acid.

6. The method of treating a copper solution which consists in forming a combination of an organic compound and sulphurous acid, adding such compound to the copper solution and subjecting the same to high temperature and high pressure.

7. The method of treating a copper solution which consists in subjecting it to a high temperature and pressure and to an aliphatic compound which contains the aldehyde group to precipitate metallic copper.

8. The method of treating a sulphate copper solution which consists in subjecting it to a high temperature and pressure and to an aliphatic compound which contains the aldehyde group to precipitate metallic copper.

9. The method of treating a copper solution containing impurities which consists in first subjecting it to a high temperature and pressure and precipitating the copper by means of an aliphatic compound which contains the aldehyde group.

In witness whereof I have hereunto signed my name.

LOUIS F. CLARK.